(12) United States Patent
Lee et al.

(10) Patent No.: US 6,785,536 B1
(45) Date of Patent: Aug. 31, 2004

(54) HOME ZONE SERVICE METHOD FOR MOBILE TELEPHONE SUBSCRIBERS IN MOBILE RADIO COMMUNICATION SYSTEM

(75) Inventors: Yun-Hee Lee, Songnam-shi (KR); Young-Soo Park, Yongin-shi (KR)

(73) Assignee: Samsung Electronics Co, Ltd., Suwon-si (KR)

( * ) Notice: Subject to any disclaimer, the term of this patent is extended or adjusted under 35 U.S.C. 154(b) by 924 days.

(21) Appl. No.: 09/609,909

(22) Filed: Jul. 3, 2000

(30) Foreign Application Priority Data

Jul. 5, 1999 (KR) ......................................... 1999-26956

(51) Int. Cl.$^7$ ............................................. H04M 15/00
(52) U.S. Cl. ...................... 455/408; 455/406; 455/407; 455/422
(58) Field of Search ................................ 455/406–408, 455/432, 433

(56) References Cited

U.S. PATENT DOCUMENTS

| | | | | |
|---|---|---|---|---|
| 5,592,180 A | * | 1/1997 | Yokev et al. ................ | 342/450 |
| 5,802,468 A | * | 9/1998 | Gallant et al. ............... | 455/422 |
| 5,945,948 A | * | 8/1999 | Buford et al. ............... | 342/457 |
| 5,973,643 A | * | 10/1999 | Hawkes et al. .............. | 342/457 |
| 6,044,261 A | | 3/2000 | Kazmi ......................... | 455/408 |
| 6,311,069 B1 | * | 10/2001 | Havinis et al. .............. | 455/456 |

FOREIGN PATENT DOCUMENTS

WO             97/13397            4/1997

* cited by examiner

*Primary Examiner*—Nay Maung
*Assistant Examiner*—Sujatha Sharma
(74) *Attorney, Agent, or Firm*—Cha & Reiter, LLC.

(57) ABSTRACT

Disclosed is a home zone service method for assigning a specified zone to a mobile telephone subscriber and charging the subscriber at different billing rated accordingly as the subscriber makes a telephone call inside or outside the zone. According to the home zone service method, a zone which is defined by a first measurement value and a second measurement value as a sub-sector is determined by measuring a round trip delay from a fixed location in a sector of a cell to the neighbor base stations to which the subscriber belongs, so that a predetermined home zone database including the first value and the second value is prepared. The round trip delay is measured from a specified signal if a portable mobile terminal of the subscriber generates a request signal to establish a call connection. Then, it is determined whether the subscriber is located inside the sub-sector if the measured round trip delay falls between the first value and the second value of the home zone database.

7 Claims, 5 Drawing Sheets

FIG. 4

| NAME | ADDRESS | TELEPHONE NUMBER 1 (NSN) | TELEPHONE NUMBER 2 (MTN) | BASE STATION, SECTOR ID, RTD (MAX/MIN) | | |
|---|---|---|---|---|---|---|
| GIL-DONG HONG | SEOHYUN-DONG, BUNDANG-KU | 0342-779-8180 | 011-779-xxxx | 1, α,16/40 | 1, β,20/44 | 3, γ,24/48 |
| DU-SAN PAIK | HAMKYUNG-DO | 0999-999-9999 | 011-yyy-yyyy | 3, α,10/34 | 4, β,10/34 | 5, γ,22/46 |

# HOME ZONE SERVICE METHOD FOR MOBILE TELEPHONE SUBSCRIBERS IN MOBILE RADIO COMMUNICATION SYSTEM

CLAIM OF PRIORITY

This application makes reference to, incorporates the same herein, and claims all benefits accruing under 35 U.S.C. Section 119 from an application for HOME ZONE SERVICE METHOD FOR MOBILE TELEPHONE SUBSCRIBERS IN MOBILE RADIO COMMUNICATION SYSTEM filed earlier in the Korean Industrial Property Office on Jul. 5, 1999 and there duly assigned Ser. No. 26956/1999.

BACKGROUND OF THE INVENTION

1. Field of the Invention

The present invention relates to a home zone service for a portable mobile telephone subscriber within a mobile telecommunication network. More particularly, the present invention relates to a method for improving accuracy and performance in providing a home zone service.

2. Description of the Related Art

A home zone service is known as allocating a predefined zone, known as "home zone", so that a different charging rate can be applied to a mobile telephone subscriber, depending on whether the subscriber is located within the home zone when placing a call. Thus, a mobile subscriber can selectively designate a number of different home zones at a given time as the mobile subscriber moves from one geographic location to another geographic location.

If the vicinity of a subscriber's residential area were defined as the home zone service area, a service charge equivalent to a local wired telephone service can be applied to a mobile phone subscriber. But, if a call is made outside of the home zone, a higher charging rate corresponding to a radio telephone call rate is applied to the subscriber.

If a subscriber requests a home zone service, the boundary of the home zone is determined according to various factors, such as the position (latitude/longitude) of the base station with respect to the subscriber's address, the base station coverage area, the installation conditions of the base station, the multi-path characteristics of the base station area, etc.

With reference to FIG. 1, a cell site is divided into a plurality of sectors. Accordingly, a home zone can be defined to include the whole cell area (base station) or one of the sectors. In determining the home zone, however, the accuracy of home zone recognition is important to the service providers in terms of the amount of revenue they can generate. A minor error in determining the home zone boundary, causing the widening of the home zone boundary, can cost a significant revenue loss to the service providers. Thus, the ability to accurately recognize the home zone boundary when a subscriber originates (or terminates) a call within the home zone is important in boosting revenue for service providers.

SUMMARY OF THE INVENTION

Accordingly, the present invention has been made in an effort to solve the problems occurring in the related art, and an object of the present invention is to provide a home zone service method which can perform a more accurate way of determining whether a mobile subscriber is located within the home zone service when making a call connection.

In order to achieve the above object, according to the present invention, there is provided a home zone service method for associating a predetermined zone to a mobile telephone subscriber and charging the subscriber at different billing rates based on whether the subscriber makes a telephone call inside or outside the home zone. The method includes the steps of: associating a plurality of reduced charging areas with a mobile subscriber, wherein the boundary of reduced charging area is defined as a first measurement value and a second measurement value, and wherein the first value and the second value are measured based on a mean round trip delay from a plurality of locations within the sector of a cell site to which the subscriber is located in relation to the neighboring base stations, then preparing a home zone database including the measured first value and the second value; calculating a round trip delay of a request signal of the mobile subscriber to establish a call connection; and, determining whether the subscriber is inside the home zone if the calculated round trip delay falls between the first value and the second value retrieved from the home zone database.

According to one aspect of the present invention, if the mobile phone is located within the home zone, the subscriber is informed of whether he/she is located within the home zone.

According to another aspect of the present invention, the predetermined home zone data base is stored and retrieved from a data base management center.

BRIEF DESCRIPTION OF THE DRAWINGS

The above object and advantages of the present invention will become more apparent by describing the preferred embodiment in detail with reference to the attached drawings in which:

FIG. 4 is a table exemplifying a subscriber information database for the home zone service according to the embodiment of the present invention;

DETAILED DESCRIPTION OF THE PREFERRED EMBODIMENT

Figure 1:
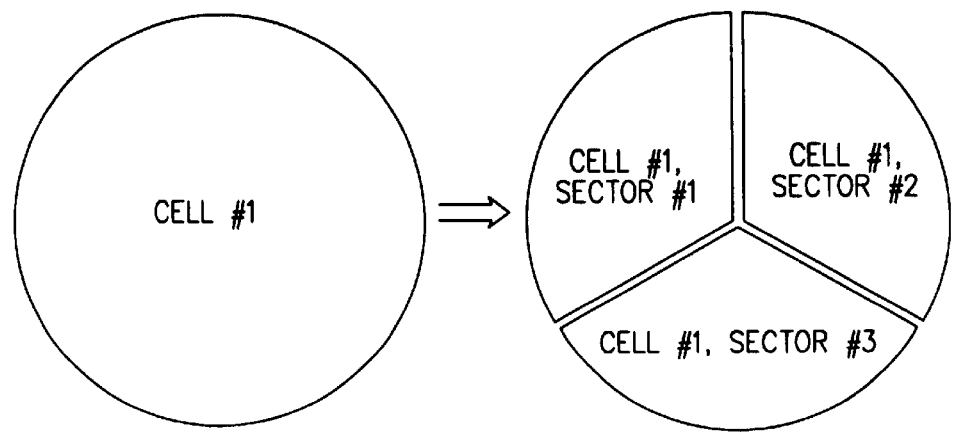
FIG. 1 is a view explaining the concept of a sector based home zone.

Reference will now be made in greater detail to the preferred embodiment of the present invention. In the drawings, the same elements are denoted by the same reference numerals even though they are depicted in different drawings. For the purpose of clarity, a detailed description of well-known functions and configurations incorporated herein will be omitted as it may make the subject matter of the present invention unclear.

Figure 2:
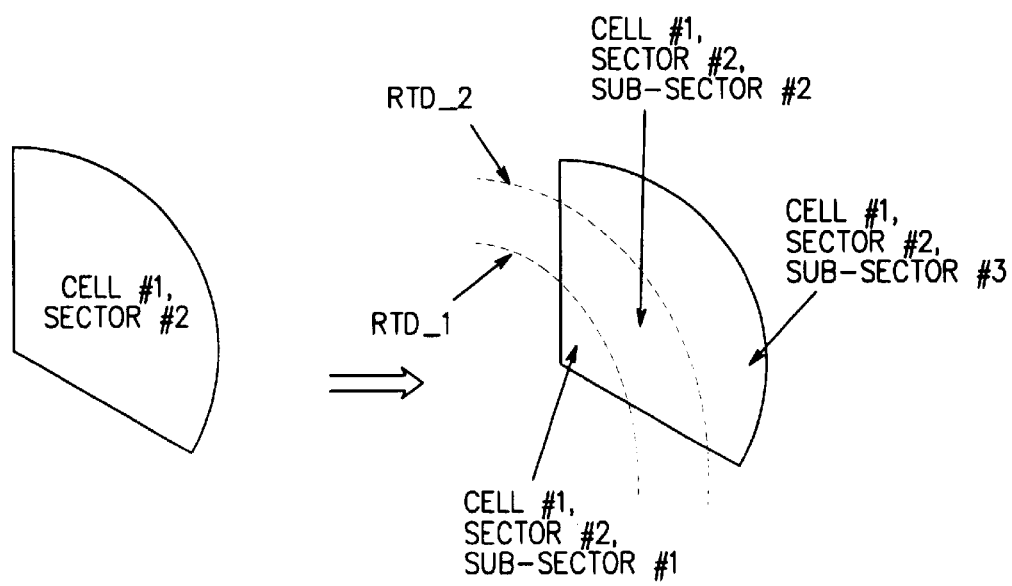
FIG. 2 is a view explaining the concept of a sub-sector based home zone according to the embodiment of the present invention.

FIG. 2 is a view illustrating the concept of a sub-sector defining a home zone according to the embodiment of the present invention. A home zone can be defined based on a cell site (base station) or one of the sectors of the cell site. The home zone designated within the sector may be called a sub-sector based home zone, as shown in FIG. 2.

As illustrated in FIG. 2, a sector #2 of a cell #1 is divided into, for example, a plurality of sub-sectors #1–#3. This division of a sector into different sub-sector zones is performed using a round trip relay (RTD) value. As an example, the division of the subsectors #1 and #2 is realized based on the RTD_1 boundary and the division of the subsectors #2 and #3 is realized based on the RTD_2 boundary. The calculation of the RTD_1 and the RTD_2 used to designate different home zones is discussed later in the specification.

Figure 3A:
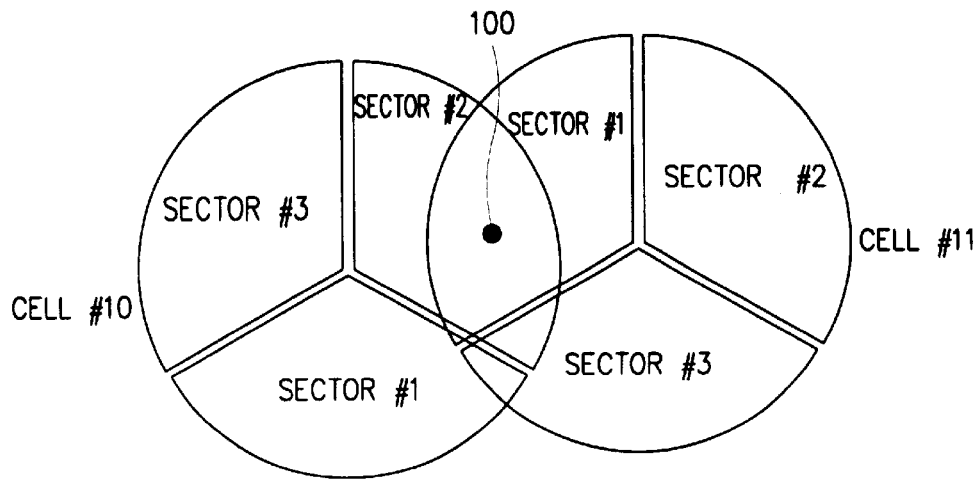
FIGS. 3A and 3B are other views explaining the concept of a sub-sector based home zone according to the embodiment of the present invention.
Figure 3B:
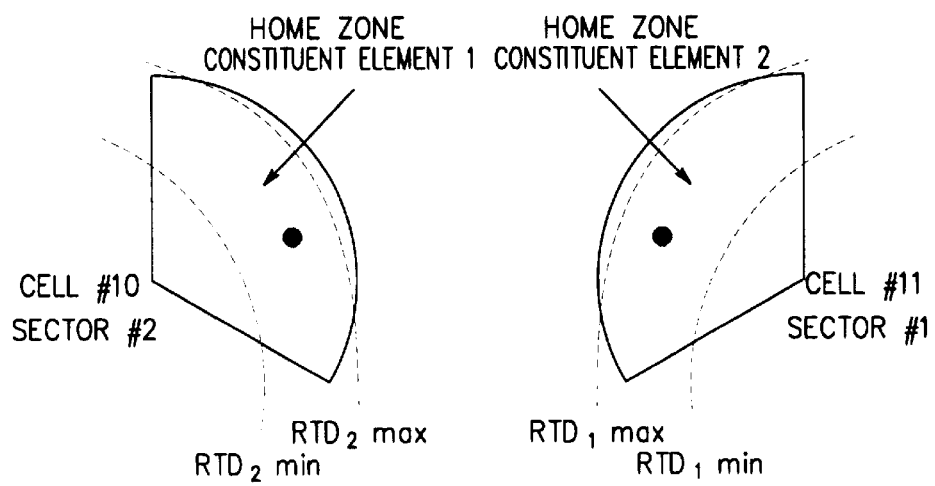

FIGS. 3A and 3B are other views illustrating the concept of determining a sub-sector based home zone according to the embodiment of the present invention.

As shown in FIG. 3A, if a subscriber 100 is position at a given location, a portion of the sector #2 of a cell #10 can overlap a portion of the sector #1 of a cell #11. As shown in FIG. 3B, the location of the subscriber can be overlapped by two different home zones. Thus, the subscriber 100 belongs not only to the sub-sector defined by the $RTD_2max$ boundary and the $RTD_2min$ boundary in the sector #2 of the cell #10, but it also belongs to the sub-sector defined the $RTD_1max$ boundary and the $RTD_1min$ boundary in the sector #1 of the cell #11. Thus, if a subscriber 100 makes a telephone call in either of the two subsectors, a fee corresponding to a local call will be charged to the mobile phone subscriber.

Now, the process of calculating the RTD to define a home zone will be explained in detail.

If it is assumed that a circular home zone is determined to include a fixed region (for example, around the house of the mobile subscriber), the maximum and the minimum distance between the home zone and a neighboring base station can be defined according to a service provider or user. At this time, the minimum distance is the shortest distance among lineal distances leading from the base station to the inner boundary of the home zone. The maximum distance is the longest distance among lineal distances leading from the base station to the outer boundary of the home zone which is in the opposite direction of the inner boundary of the home zone. These distances can be determined using a round trip delay (RTD). The RTD represents the value obtained by dividing the distance by the propagating speed (i.e., C=300,000 Km/sec), then multiplying the divided value by 2 to counter for the turnaround distance. The base station measures the turnaround time by measuring the time during which a radio wave radiated from the base station reaches the mobile terminal and return back to the base station. This can be expressed by the following equation:

$$RTD\_i = 2 \times (D\_i/C).$$

Here, "i" represents 1 or 2. "D_i" represents a variable that represents a minimum distance when "i" is 1 and represents a maximum distance when "i" is 2.

In order to enhance the accuracy of the boundary of the home zone using the RTD values, the following complementary measures are further performed.

An approximate distance from the base station to the respective location can be linearly calculated. Since the turnaround time between the base station and the mobile terminal is calculated by a digital signal processor (DSP) of the base station, the RTD value can be obtained by dividing the calculated distance by the propagation speed then multiplying the divided value by 2. However, the radio wave is transmitted in a multipath characteristic environment. Thus, a delay time caused by the multipath characteristics of the radio wave can affect the RTD calculation. Typically, the delay time involved in similar background areas exhibit similar delay characteristic. Thus, in the embodiment of the present invention, the delay time involved in different background is collectively measured and their mean values are measured to create a database, which defines the reduced charging area. The delay times vary depending on different location where the mobile phone might be located, such as a downtown area, a shopping center, apartment or factory building area, etc. Thus, using the previously determined database which accounts for various multipath characteristics, a more accurate RTD value can be obtained to define the home zone.

In order to provide a more accurate RTD, an initial database is added with a delay time obtained by collecting and averaging different delay times at a given rate between various locations and its neighboring base stations in a real world environment. Then, a mean RTD value can be obtained at a given location of the mobile phone. As part of the effort to determine an accurate RTD value, which is used to designate the reduced charging area, another factor is measured in deriving the test database. Since most users would tend to define their residential areas as the home zone to benefit the lower billing rate, the test database is obtained by estimating the time that the users will most likely be at their residence. For instance, since there is a greater possibility that the subscriber stays in his/her house during the time period between 24:00 to 06:00, the experimented mean RTD value is measured at this time duration.

FIG. 4 is a table exemplifying the subscriber information database for the home zone service according to the embodiment of the present invention. The database shows that two subscribers have been registered.

With reference to FIG. 2, the first subscriber, Mr. Gil-dong Hong, who resides in 123 Seohyun-Dong, Bundang-Ku, uses 0342-779-8180 as a local number inside the home zone and uses 011-779-xxxx as a mobile number outside his home zone. Mr. Hong's house is under the service provided by three neighboring base stations. The home zone registered by Mr. Hong is defined by the region within the range of 16–40 chips from an a sector of a base station 1. At this time, the values of 16 and 40 represent the minimum RTD and the maximum RTD, respectively, but the actual distance corresponds in the range of 8–20 chips from the base station since the RTD takes into account the round trip between the base station and the mobile phone. Thus, the home zone is associated in the range of 10–22 chips for the β sector of a base station 2 and in the range of 12~24 chips for the γ section of a base station 3. Here, the distance of one chip represents 245 m, which is obtained by dividing the distance by the radio propagation speed, 300,000 Km/sec, by the code division multiple access (CDMA) modulation frequency of 1.2244 MHz.

Figure 5:
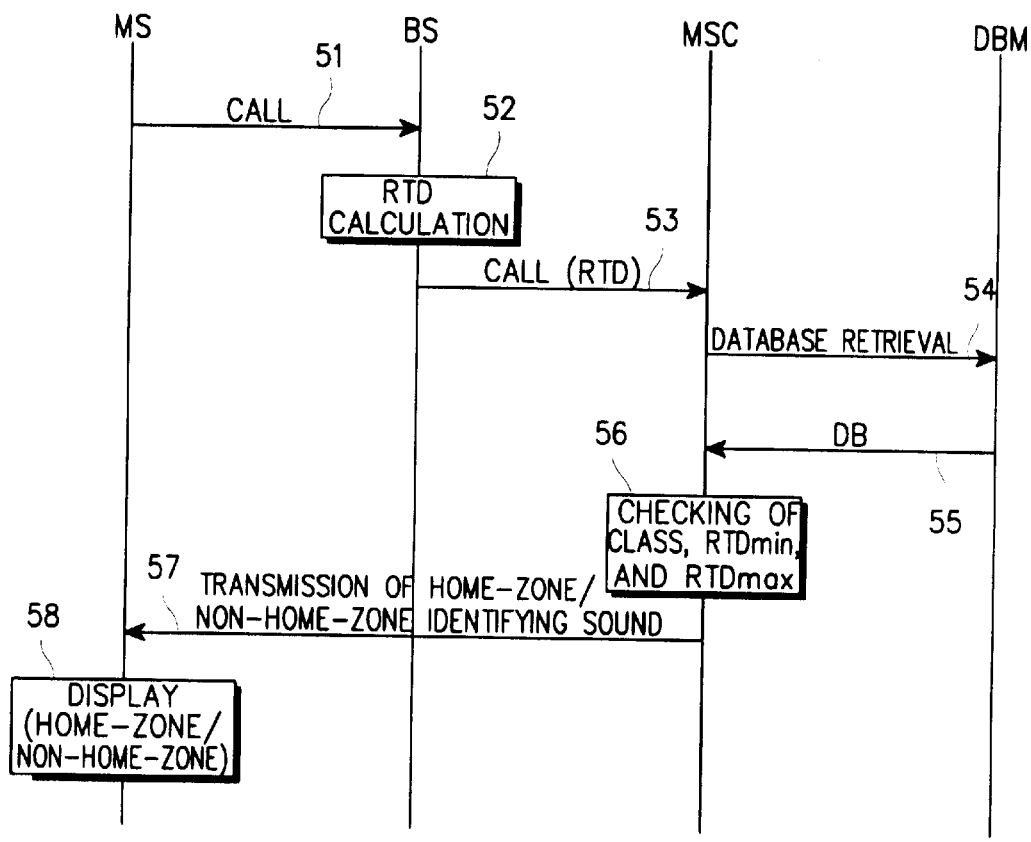
FIG. 5 is a flowchart illustrating the home zone identifying process performed directly by a subscriber according to the embodiment of the present invention; and, FIG. 6 is a flowchart illustrating the home zone identifying process performed by a mobile terminal according to the embodiment of the present invention.

FIG. 5 is a flowchart illustrating the home zone identifying process operated directly by the subscriber according to the embodiment of the present invention.

With reference to FIG. 5, a subscriber can directly dial the specified keys (for example, *89) of the mobile terminal to ascertain whether he/she is within the home zone using a mobile terminal MS. The dial information according to the above call is transmitted to the base station BS (step 51). The base station receives the dial information and simultaneously calculates the RTD accordingly (step 52). Then, the base station transmits the dial information and the calculated RTD to a mobile switching center (step 53). The mobile switching center requests to retrieve the database from a database management center (DBM) and in turn receives the corresponding database from the DBM (steps 54 and 55). Here, for convenience, the DBM is used as a term which includes the home location registration (HLR), the visitor location registration (VLR), the location determination module, the service provision center (LDSPC), the customer care center (CCC), etc. Performing various operations among the HLR, VLR, LDSPC, and CCC and performing communication between the mobile switching center and the DBM should be obvious to those in this art.

Thereafter, the base station checks the service class of the subscriber, the maximum RTD value (RTDma) and the minimum RTD value (RTDmin) based on the retrieved database (step 56). The subscriber selects the service class when he/she requests the home zone service. Then, the subscriber can select the service either in the home zone only or both services including the home zone and the mobile zone, which is outside of the home zone.

If the subscriber is registered for the home zone service and requests such service, the base station, after checking that the subscriber qualifies for the home zone service based on the retrieved database, transmits a home-zone identifying signal to the mobile terminal through a traffic channel. If the condition is not satisfied, the base station transmits a non-home-zone identifying sound (step 57). At this time, the mobile terminal displays the information whether or not the current location of the mobile terminal is within the home zone, so that the subscriber can be informed (step 58).

Figure 6:
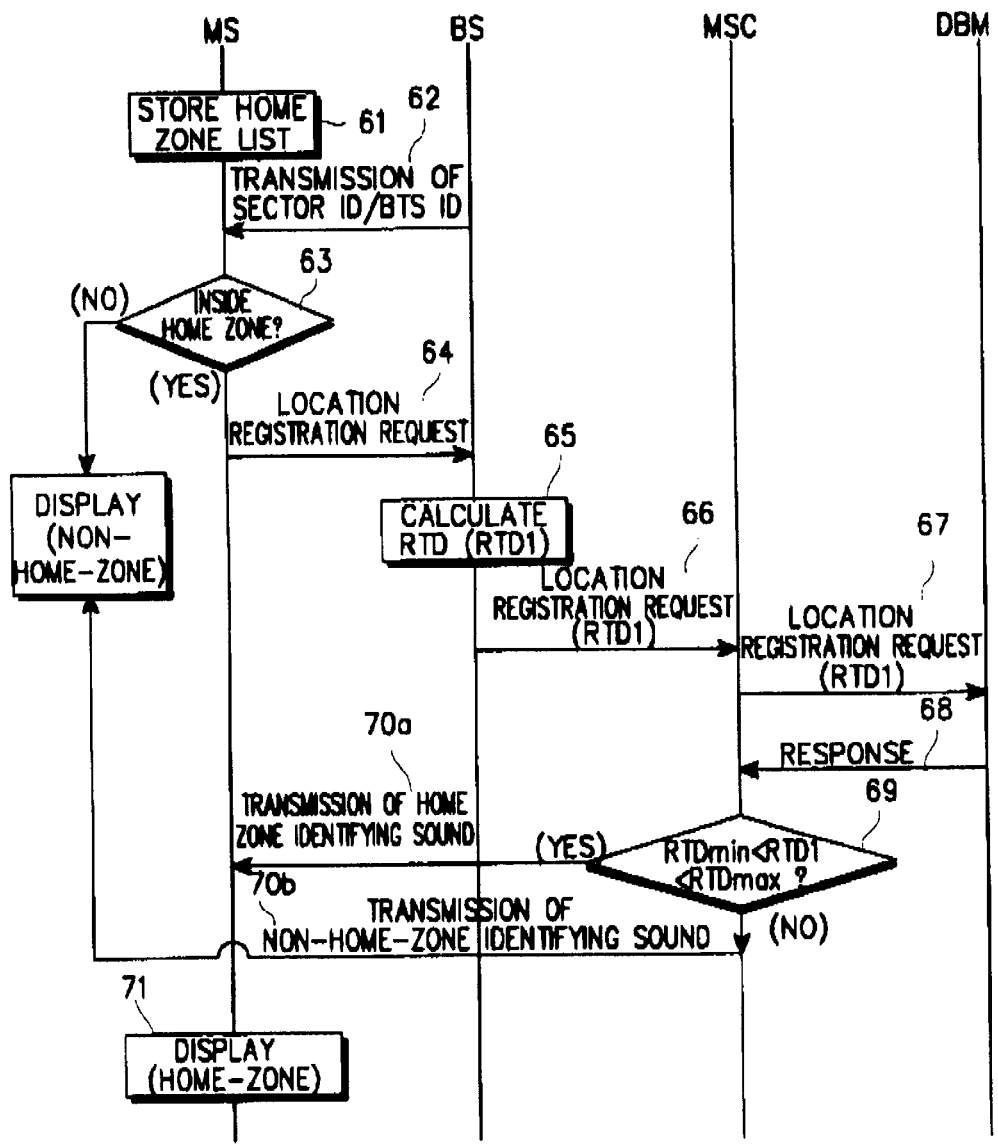

FIG. 6 is a flowchart illustrating the home zone identifying process operated by a mobile terminal according to the embodiment of the present invention. The home zone identifying process enables the mobile terminal to identify whether the mobile terminal is located within the home zone and enables the mobile terminal to automatically display a deviation signal if the mobile terminal deviates outside of the home zone. Thus, the mobile station stores the home zone list (step 61).

The base station transmits the base station ID and the sector ID to the mobile terminal (step 62). Then, the mobile terminal ascertains whether the base station belongs to its home zone with reference to a home zone list (step 63) and transmits a location registration request if the base station belongs to the home zone (step 64). The base station receives the location registration request and simultaneously calculates the RTD (RTD1) accordingly (step 65). The mobile switching center transmits a location registration request, the base station information, and the calculated RTD (RTD1) to the DBM (step 66). At this time, the DBM transmits a response including a predetermined base station information based on the home zone database to the mobile switching center. That is, information corresponding to the maximum RTD value (RTDmax) and the minimum RTD (RTDmin) relating to the subscriber is obtained (step 68). The mobile switching center checks whether the calculated RTD (RTD1) falls within the range between the maximum RTD (RTDmax) and the minimum RTD (RTDmin) based on the predetermined database (step 69). If the condition is satisfied, the mobile switching center transmits a home-zone identifying signal to the mobile terminal through the traffic channel (step 70a), while if the condition is not satisfied, the mobile switching center transmits a non-home-zone identifying signal to the mobile terminal (step 70b). Then, the mobile terminal displays whether its current location is located within the home zone to inform the subscriber (step 71).

As described above, the present invention has advantages in that it can perform a more accurate and efficient home zone service by determining whether the mobile terminal is located within the home zone by comparing the predetermined sector-based home zone range to the current location of the mobile terminal.

While this invention has been described in connection with what is presently considered to be the most practical and preferred embodiment, it is to be understood that other modifications thereof may be made without departing from the scope of the invention. Thus, the invention should not be limited to the disclosed embodiment but should be defined by the scope of the appended claims and their equivalents.

What is claimed is:

1. A method for determining whether the subscriber of a mobile phone is located within a home zone service to qualify for a different charging rate, comprising the steps of:
   (a) measuring a round trip delay (RTD) from a plurality of testing locations within a sector of a cell site in relation to a plurality of neighboring base stations to determine a plurality of reduced charging areas with a mobile phone subscription, wherein the boundary of the reduced charging areas are defined by a first mean RTD value and a second mean RTD value;
   (b) preparing a predetermined home zone database by associating the plurality of the reduced charging areas with the mobile phone subscription using the first value and the second value;
   (c) calculating a round trip delay (RTD) if the mobile phone generates a request signal to establish a call connection; and,
   (d) determining whether the measured RTD falls within a range between the first value and the second value associated with the mobile phone in the home zone database to determine whether the mobile phone is located within the home zone service.

2. The method as claimed in claim 1, wherein the first value and the second value correspond to a minimum value and a maximum value of the round trip delay, respectively.

3. The method as claimed in claim 1, further comprises the step of notifying the subscriber of the mobile phone if the mobile phone is located within the home zone service.

4. The method as claimed in claim 1, wherein the step (c) further comprises the steps of:
   receiving the request signal by a base station currently serving the mobile phone; and,
   transmitting the calculated RTD to a mobile switch center in communication with the base station.

5. The method as claimed in claim 1, wherein the step (d) further comprises the step of retrieving the predetermined home zone database from a database management center.

6. A method for determining whether a subscriber is making a call connection within a home zone area using a predetermined home zone database, which includes a first round trip delay value and a second round trip delay value defining the home zone area for a mobile phone subscriber, and wherein a different charging rate is applied if a request for a call connection is made within the home zone area, the method comprising the steps of:
   (a) transmitting, by the mobile phone, an originating signal to a base station to establish a call connection;
   (b) upon receiving the originating signal, calculating a round trip delay (RTD) of the originating signal by the base station;
   (c) transmitting, by the base station, the calculated round trip delay and the originating signal to a mobile switching center;
   (d) determining, by the mobile switching center, whether the calculated round trip delay falls within a range between the first value and the second value associated with the mobile phone in the predetermined home zone database; and, (e) if the measured RTD value falls within the first value and the second value, allocating a communication channel to the mobile phone by the base station.

7. A method for determining whether a subscriber is making a call connection within a home zone area using a predetermined home zone database, which includes a first round trip delay value and a second round trip delay value defining the home zone area for a mobile phone subscriber, and wherein a different charging rate is applied if a request for a call connection is made within the home zone area, the method comprising the steps of:

(a) transmitting, by the mobile phone subscriber, an originating signal to a base station to establish a call connection;

(b) upon receiving the originating signal, calculating a round trip delay (RTD) of the originating signal by the base station;

(c) transmitting, by the base station, the calculated round trip delay and the originating signal to a mobile switching center;

(d) determining, by the mobile switching center, whether the calculated round trip delay falls within a range between the first value and the second value associated with the mobile phone subscriber in the predetermined home zone database; and, (e) if the calculated RTD value falls within the first value and the second value, transmitting a home zone identifying signal to the mobile phone subscriber by the mobile switching center.

* * * * *